UNITED STATES PATENT OFFICE 2,653,953

3,4-BENZOPYRENE-1,5-QUINONE

Herman E. Schroeder, Kennett Square, Pa., assignor to E. I. du Pont de Nemours & Company, Wilmington, Del., a corporation of Delaware No Drawing. Application March 29, 1950,
Serial No. 152,751

2 Claims. (Cl. 260—362)

This invention relates to 3,4-benzopyrene-1,5-quinones, and to a process for preparing the same.

The new compounds of this invention have the general formula:

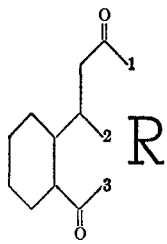

in which R stands for a hydrocarbon radical of the group consisting of naphthalene, anthracene and fluoranthene to which the bonds at the positions 1 and 2 are attached to the peri-position of the naphthalene nucleus of said hydrocarbon radicals, and 3 is attached to a position ortho to one of the peri-positions.

The synthesis of polynuclear aromatic systems is ordinarily accomplished by reactions which add one or two rings at a time to a ring nucleus and generally leads to complex systems only after a rather laborious procedure. Using the generally conceived methods of construction, many ring systems which are desirable for use as dyes or pharmaceuticals are virtually unobtainable. In this respect 3,4-benzopyrene, and compounds having that nucleus which may be of considerable importance as dye intermediates and carcinogenic substances, require rather involved methods of synthesis which have severely limited the study of this particular ring system in the pharmaceutical and dye fields.

It is an object of this invention to produce 3,4-benzopyrene-1,5-quinones as new and valuable compounds useful in the synthesis of dyes and pharmaceuticals, and to provide a simple and economical process whereby these new compounds may be prepared.

I have found that phthalidene acetic acid can be condensed with naphthalene and substances containing the naphthalene nucleus, such as anthracene and fluoranthene, in a substantially anhydrous hydrogen fluoride to effect the simultaneous alkylation and acylation of the naphthalene nucleus, thereby adding to that nucleus in a single operation three new rings containing an amphiquinonoid system. This reaction is exemplified with naphthalene as follows:

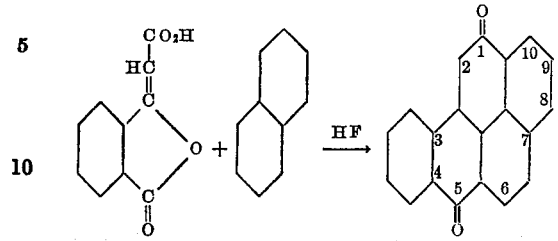

This reaction is effected by treating a mixture of one mol equivalent of phthalidene acetic acid and at least one mol equivalent of compound containing the naphthalene nucleus with sufficient anhydrous hydrogen fluoride so that the final concentration after elimination of water from the reactants will not be less than 36% hydrogen fluoride, for several hours at a temperature sufficient to effect the condensation, usually in the range of from 20° to 110° C.

The following examples will serve to illustrate the invention. The parts used are by weight.

Example 1

To a mixture of naphthalene (170 parts) and phthalidene acetic acid (250 parts) in a cold, evacuated stainless steel autoclave there was added with stirring 2100 parts of substantially anhydrous hydrogen fluoride. After sealing the autoclave, the contents were stirred two hours at 8° C. and 16 hours at 30°–34° C. The charge was cooled, discharged onto ice water with good stirring, filtered and washed acid-free. The yellow product was extracted with sodium bicarbonate (100 parts in 6000 parts of water) to remove acidic by-products, filtered, washed and dried to yield 266 g. (72.5% yield) of crude 3,4-benzopyrene-1,5-quinone, melting range 300°–307° C. On recrystallization from ortho-dichlorobenzene, substantially pure benzopyrene quinone crystallizing in the form of orange needles, melting range 324°–326° C. (327° after a second crystallization), was obtained. Purification was also effected by vatting with alkaline hydrosulfite. 3,4 - benzopyrene - 1,5 - quinone dyes vegetable fibers yellow shades from an orange alkaline hydrosulfite vat and gives bluish-red solutions in concentrated sulfuric acid. The calculated analysis for this compound having the formula $C_{20}H_{10}O_2$ was C=85.0 and H=3.54. Analysis of the compound produced by this example was found to be C=84.82 and H=3.54. This product has been found to be a 3,4-benzopyrene-1,5-quinone differing from the known benzopyrene quinones in the location of the carbonyl groups. Differences from the known quinones are illustrated in the following tabulated comparison:

| Quinone | 1,5 (amphi) | 5,8 (trans) | 5,10 (cis) |
| --- | --- | --- | --- |
| melting point | 327° | 295° | 245°. |
| color | orange-yellow | golden orange | orange-red. |
| color of vat | orange | orange-yellow | reddish-yellow. |
| color in $H_2SO_4$ | red | carmine-red | olive-brown. |
| Reference | | Ann. 537, 157 (1939). | Ann. 531, 51 (1937). |

The presence of the benzopyrene nucleus was established by zinc dust distillation of the quinone to yield 3,4-benzopyrene melting range 177°–178° C., melting range of trinitrobenzene complex 223°–224° C., both identical with authentic preparations.

*Example 2*

A mixture of 7.7 parts of naphthalene, 11.4 parts of phthalidene acetic acid and 115 parts of hydrogen fluoride in a steel pressure vessel heated 2 hours at 20°–25° and 2 hours at 40°–45° afforded 7 parts of benzopyrene quinone. Similar results were obtained when the reaction was carried out entirely at 20°–25° C. or at 60° C.

*Example 3*

A mixture of 9 parts of anthracene, 8 parts of phthalidene acetic acid and 123 parts of hydrogen fluoride, heated for 2 hours at 40° C., produce 14.7 parts of a bright orange product melting at 316°–317° C. after recrystallization from glacial acetic acid. This product apparently represents an intermediate stage in the reaction, since further condensation affords the alkali insoluble polynuclear keto hydrocarbon. Thus, a mixture of 190 parts of phthalidene acetic acid, 183 parts of anthracene and 2550 parts of hydrogen fluoride, heated 2 hours at 40° C. then 2 hours at 60° C. and then 4 hours at 100° C. in a stainless steel autoclave, produces 336 parts of a violet crystalline product which is no longer soluble in alkali but dissolves in concentrated sulfuric acid to give a green solution and gives bordeaux shades on cotton from a red alkaline hydrosulfite vat. The product is considered to be a dibenzopyrene quinone of the formula:

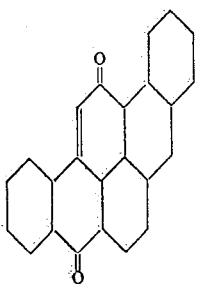

*Example 4*

Following the general process of Examples 1 and 2, a mixture containing 11.4 parts of phthalidene acetic acid, 12.3 parts of fluoranthene and 94 parts of anhydrous hydrogen fluoride, when treated for 7 hours at 25° C. and then 12 hours at 40° to 50° C., produces 19.65 parts (92% of theory) of a red brown solid dyeing cotton brown shades from a brown alkaline hydrosulfite vat. It is considered as having the formula:

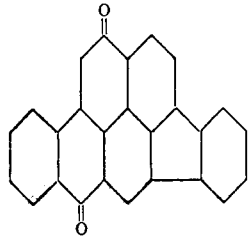

The 3,4-benzopyrene-1,5-quinones of this invention are readily vattable and afford yellow to bordeaux prints when applied by the normal vat color printing procedures. For printing, the dichloro derivatives of these benzopyrenequinones which may be prepared by chlorination with sulfuryl chloride in nitrobenzene are of particular interest, the dichlorobenzopyrene quinone so prepared affording strong, bright yellow prints on cotton and rayon. Halogenation of these products to bromo or chloro derivatives followed by condensation with aminoanthraquinones give many clear shades in the gray, green, black range.

The new benzopyrenequinone itself is of particular utility as a source for 3,4-benzopyrene, a carcinogenic substance of intense interest in medical and biochemical research. Older methods of synthesis have involved many steps from available starting products. Benzopyrenequinone obtained in one step from naphthalene is converted to benzopyrene either by distillation in the presence of zinc dust or by use of the zinc dust-zinc chloride fusion method of Clar. Alternatively, the leuco ester, for example, the diacetate obtained by treating benzopyrenequinone with acetic anhydride and zinc dust in the presence of triethylamine catalyst, may be subjected to the same zinc dust distillation or fusion in zinc chloride to afford the 3,4-benzopyrene in good yield.

While the foregoing examples employ anhydrous hydrogen fluoride as a reaction medium, because of the unusual affinity of HF for water, it may be diluted with water or an unreactive organic solvent such as nitrobenzene or ortho-dichlorobenzene, or in certain cases with an excess of the hydrocarbon component. Sufficient hydrogen fluoride should be employed to leave the final concentration of hydrogen fluoride in the water formed at least 37% and preferably above 54%. It is preferred that at least one mol of HF be employed for each mol of water formed, and best results are usually obtained when hydrogen fluoride is the reaction medium. A decrease in the final hydrogen fluoride concentration is normally accompanied by the need for higher reaction temperatures. In hydrogen fluoride, temperatures in the range of from 20° to 140° C. give good results.

I claim:

1. A method for preparing 3,4-benzopyrene-1,5-quinones which comprises reacting a mixture of one mol equivalent of phthalidene acetic acid with at least one mol equivalent of the compound of the group consisting of naphthalene, anthracene and fluoranthene in sufficient anhydrous hydrogen fluoride so that during the condensation the concentration of the hydrogen fluoride will not be diluted by the water liberated in the reaction to less than 36% hydrogen fluoride.

2. A method for preparing 3,4-benzopyrene- 1,5-quinone which comprises reacting a mixture of one mol equivalent of phthalidene acetic acid with at least one mol equivalent of naphthalene in sufficient anhydrous hydrogen fluoride so that during the condensation the concentration of the hydrogen fluoride will not be diluted by the water liberated in the reaction to less than 36% hydrogen fluoride.

HERMAN E. SCHROEDER.

References Cited in the file of this patent

UNITED STATES PATENTS

| Number | Name | Date |
|---|---|---|
| 1,564,584 | Kranzlein et al. | Dec. 8, 1925 |
| 1,874,547 | Kranzlein et al. | Aug. 30, 1932 |

OTHER REFERENCES

Ann. vol. 531, pages 129–130, 1937.